(12) United States Patent
Sugime et al.

(10) Patent No.: US 11,165,510 B2
(45) Date of Patent: Nov. 2, 2021

(54) POWER OVER FIBER SYSTEM AND POWER-SUPPLYING-SIDE DATA COMMUNICATION DEVICE OF POWER OVER FIBER SYSTEM

(71) Applicant: KYOCERA Corporation, Kyoto (JP)

(72) Inventors: Tomonori Sugime, Yokohama (JP); Takahiro Kobayashi, Sagamihara (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/907,314

(22) Filed: Jun. 22, 2020

(65) Prior Publication Data

US 2021/0036785 A1    Feb. 4, 2021

(30) Foreign Application Priority Data

Aug. 2, 2019   (JP) .............................. JP2019-142682

(51) Int. Cl.
| | |
|---|---|
| *H04B 10/80* | (2013.01) |
| *H04B 10/25* | (2013.01) |
| *H04B 10/50* | (2013.01) |
| *H04B 10/69* | (2013.01) |

(52) U.S. Cl.
CPC ........... *H04B 10/807* (2013.01); *H04B 10/25* (2013.01); *H04B 10/503* (2013.01); *H04B 10/691* (2013.01)

(58) Field of Classification Search
CPC .......................... H04B 10/806; H04B 10/807
USPC ....................................................... 398/171
See application file for complete search history.

(56) References Cited

U.S. PATENT DOCUMENTS

| | | | | |
|---|---|---|---|---|
| 4,928,319 | A * | 5/1990 | Pitt ...................... | H04B 10/807 398/171 |
| 5,528,409 | A * | 6/1996 | Cucci .................. | H04B 10/807 398/113 |
| 6,005,696 | A * | 12/1999 | Joline ................... | H04B 10/07 370/241 |
| 7,359,647 | B1 * | 4/2008 | Faria ..................... | H02J 7/025 398/171 |

(Continued)

FOREIGN PATENT DOCUMENTS

| | | |
|---|---|---|
| JP | 2010135989 A | 6/2010 |
| JP | 2015001925 A | 1/2015 |

*Primary Examiner* — Li Liu
(74) *Attorney, Agent, or Firm* — Hauptman Ham, LLP

(57) ABSTRACT

A power over fiber system includes: a first data communication device including a power sourcing equipment device; a second data communication device including a powered device; and an optical fiber cable. The first data communication device and the second data communication device perform optical communication with one another. The first data communication device is capable of controlling low power supply and high power supply that are performed by the power sourcing equipment device. Feed electric power by the high power supply exceeds feed electric power by the low power supply. The first data communication device starts up the second data communication device by the low power supply to the second data communication device, and enables the high power supply after receiving predetermined light from the second data communication device, and disables the high power supply before receiving the predetermined light.

8 Claims, 7 Drawing Sheets

(56) References Cited

U.S. PATENT DOCUMENTS

| | | | | |
|---|---|---|---|---|
| 8,358,893 B1* | 1/2013 | Sanderson | G02B 6/4415 | 385/101 |
| 8,452,183 B2* | 5/2013 | Kang | H04B 10/1149 | 398/127 |
| 8,714,837 B2* | 5/2014 | Lee | G02B 6/4246 | 385/88 |
| 9,197,329 B2* | 11/2015 | Chan | H04B 10/807 | |
| 9,294,290 B2* | 3/2016 | Charbonneau-Lefort | H04L 12/12 | |
| 9,755,745 B2* | 9/2017 | Beck | H04B 10/66 | |
| 9,793,991 B2* | 10/2017 | Crowne | H04B 10/807 | |
| 9,979,480 B1* | 5/2018 | Schubert | H04B 10/2589 | |
| 10,009,119 B1* | 6/2018 | Hiller | H02S 40/22 | |
| 2002/0044746 A1* | 4/2002 | Kronlund | H04B 10/25891 | 385/53 |
| 2003/0081280 A1* | 5/2003 | Parsons | H04B 10/071 | 398/16 |
| 2004/0266367 A1* | 12/2004 | Tuominen | H04B 10/807 | 455/91 |
| 2005/0226625 A1* | 10/2005 | Wake | H04B 10/25753 | 398/115 |
| 2008/0235418 A1* | 9/2008 | Werthen | G06F 13/385 | 710/106 |
| 2009/0016715 A1* | 1/2009 | Furey | H04B 10/807 | 398/38 |
| 2009/0238559 A1* | 9/2009 | Pfeiffer | H04B 10/807 | 398/17 |
| 2010/0290782 A1* | 11/2010 | Lee | H04Q 11/0067 | 398/58 |
| 2012/0219289 A1* | 8/2012 | Hayashi | H04J 14/0221 | 398/34 |
| 2013/0328417 A1* | 12/2013 | Takeuchi | H02J 7/025 | 307/149 |
| 2015/0214414 A1* | 7/2015 | Hodges | H01L 31/147 | 136/247 |
| 2018/0123403 A1* | 5/2018 | Kare | H01S 5/0085 | |
| 2019/0213871 A1* | 7/2019 | Van Der Mark | H04B 10/40 | |
| 2019/0342011 A1* | 11/2019 | Goergen | H04L 12/10 | |
| 2019/0377202 A1* | 12/2019 | Hoheisel | H04B 10/11 | |
| 2020/0153515 A1* | 5/2020 | Goergen | H04B 10/807 | |

* cited by examiner

POWER OVER FIBER SYSTEM AND POWER-SUPPLYING-SIDE DATA COMMUNICATION DEVICE OF POWER OVER FIBER SYSTEM

CROSS-REFERENCE TO RELATED APPLICATIONS

This application is based upon and claims the benefit of priority from the prior Japanese Patent Application No. 2019-142682, filed on Aug. 2, 2019, the entire contents of which are incorporated herein by reference.

BACKGROUND

Technical Field

The present disclosure relates to optical power supply.

Description of Related Art

Recently, there has been studied an optical power supply system that converts electric power into light called feed light, transmits the feed light, converts the feed light into electric energy, and uses the electric energy as electric power.

There is disclosed in JP 2010-135989 A an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

SUMMARY

In optical power supply, optical transmission of higher energy is expected.

When a transmission path of feed light from the power supplying side to the power receiving side is not properly connected, and a power sourcing equipment device outputs high-power feed light, the feed light may be released to the outside, and people or objects may be irradiated with the high-power feed light.

According to a first aspect of the present disclosure, there is provided a power over fiber system including:
 a first data communication device including a power sourcing equipment device including a semiconductor laser that oscillates with electric power, thereby outputting feed light;
 a second data communication device including a powered device including a photoelectric conversion element that converts the feed light into electric power, the second data communication device performing optical communication with the first data communication device; and
 an optical fiber cable including a first end connectable to the first data communication device and a second end connectable to the second data communication device to transmit the feed light and signal light, wherein the electric power obtained by the conversion of the feed light by the photoelectric conversion element is driving power for the second data communication device,
wherein the first data communication device is capable of controlling low power supply and high power supply that are performed by the power sourcing equipment device, feed electric power by the high power supply exceeding feed electric power by the low power supply, and
wherein the first data communication device starts up the second data communication device by the low power supply to the second data communication device, and enables the high power supply after receiving predetermined light from the second data communication device, and disables the high power supply before receiving the predetermined light.

According to a second aspect of the present disclosure, there is provided a power-supplying-side data communication device of a power over fiber system, including:
 a power sourcing equipment device including a semiconductor laser that oscillates with electric power, thereby outputting feed light,
wherein the power-supplying-side data communication device is capable of controlling low power supply and high power supply that are performed by the power sourcing equipment device, feed energy by the high power supply exceeding feed energy by the low power supply, and
wherein the power-supplying-side data communication device starts up a connection-counterpart data communication device by the low power supply to the connection-counterpart data communication device, and enables the high power supply after receiving predetermined light from the connection-counterpart data communication device, and disables the high power supply before receiving the predetermined light.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION OF EMBODIMENTS

Hereinafter, one or more embodiments of the present disclosure will be described with reference to the drawings. However, the scope of the present invention is not limited to the disclosed embodiments or illustrated examples.
(1) Outline of System

First Embodiment

Figure 1:
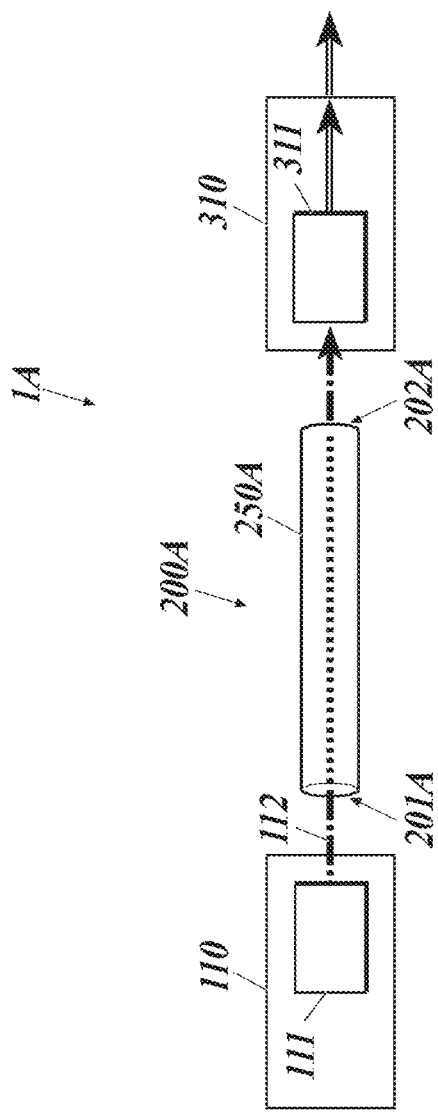
FIG. 1 is a block diagram of a power over fiber system according to a first embodiment of the present disclosure.

As shown in FIG. 1, a power over fiber (PoF) system 1A (optical power supply system) of this embodiment includes a power sourcing equipment (PSE) device 110, an optical fiber cable 200A and a powered device (PD) 310.

In the present disclosure, a PSE device converts electric power into optical energy and supplies (sources) the optical energy, and a powered device receives (draws) the supplied optical energy and converts the optical energy into electric power.

The PSE device 110 includes a semiconductor laser 111 for power supply.

The optical fiber cable 200A includes an optical fiber 250A that forms a transmission path of feed light.

The powered device 310 includes a photoelectric conversion element 311.

The PSE device 110 is connected to a power source, and electrically drives the semiconductor laser 111 and so forth.

The semiconductor laser 111 oscillates with the electric power from the power source, thereby outputting feed light 112.

The optical fiber cable 200A has one end 201A (first end) connectable to the PSE device 110 and the other end 202A (second end) connectable to the powered device 310 to transmit the feed light 112.

The feed light 112 from the PSE device 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side (PSE side) and the power receiving side (PD side) in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used, whereas when the photoelectric conversion efficiency is given priority, laser media having a laser wavelength (base wave) of less than 200 nm may be used.

Any of these semiconductor materials may be used in one of the semiconductor laser 111 and the photoelectric conversion element 311. This improves the photoelectric conversion efficiency at either the PSE side or the PD side, and improves the optical power supply efficiency.

Second Embodiment

Figure 2:
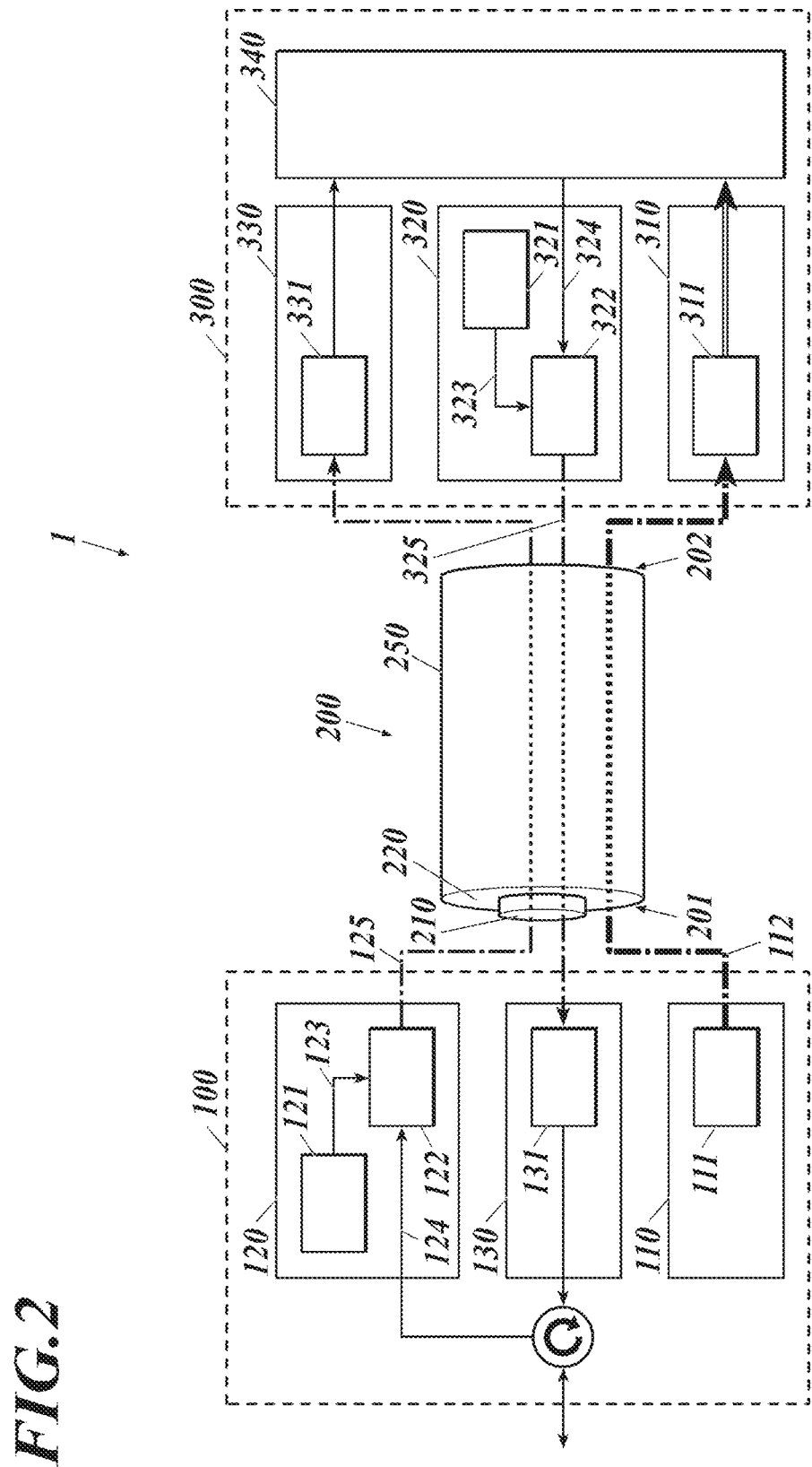
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 (power-supplying-side data communication device) including a power sourcing equipment (PSE) device 110; an optical fiber cable 200; and a second data communication device 300 including a powered device (PD) 310.

The PSE device 110 includes a semiconductor laser 111 for power supply. The first data communication device 100 includes, in addition to the PSE device 110, a transmitter 120 and a receiver 130 for data communication. The first data communication device 100 corresponds to a data terminal equipment (DTE) device, a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320 and a receiver 330 for data communication, and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 (first end) of the optical fiber cable 200, propagate through the cladding 220 and the core 210, respectively, and are output from the other end 202 (second end) of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
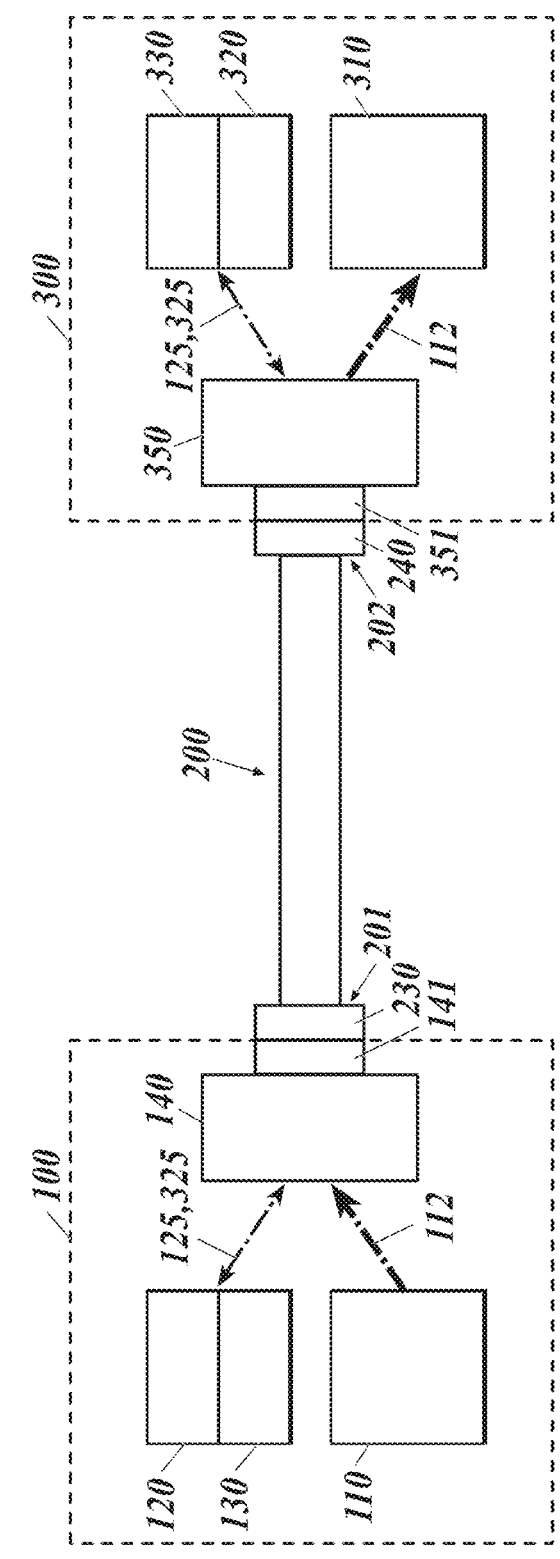
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125/325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
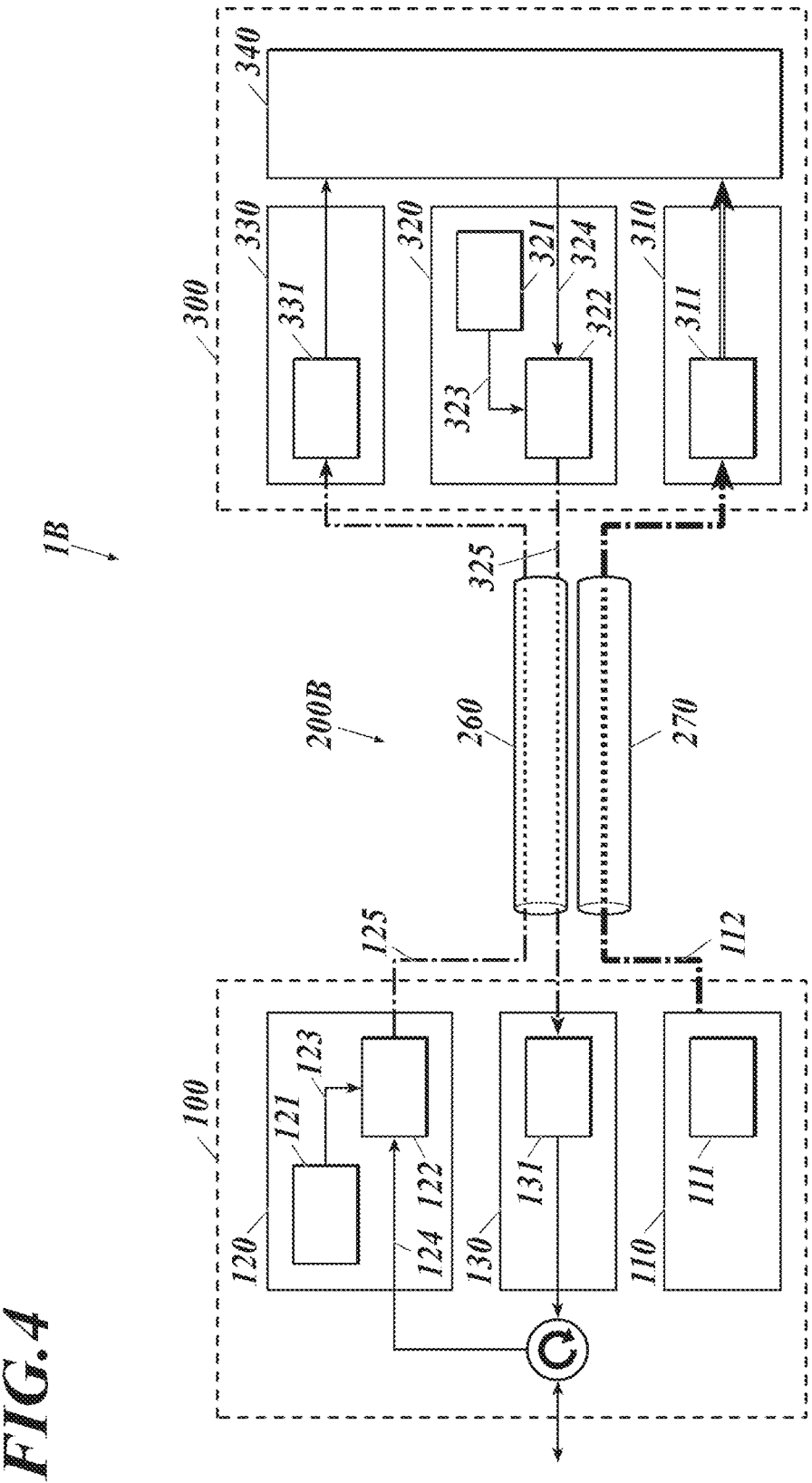
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Connection Establishment and Control of Feed Light

Next, connection establishment and control of feed light will be described with reference to FIG. 5 to FIG. 9 in addition to FIG. 2.

Figure 5:
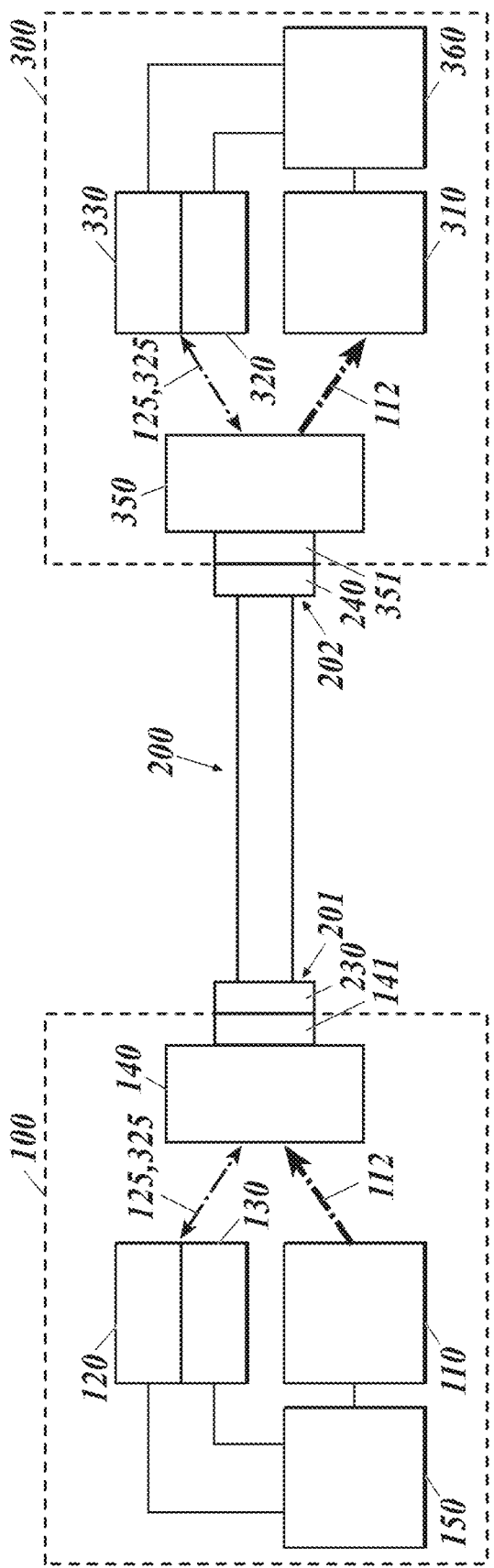
FIG. 5 is a block diagram of the power over fiber system shown in FIG. 3 with controllers shown.

In the power over fiber system 1 described as the second embodiment (configuration shown in FIG. 2 and FIG. 3), as shown in FIG. 5, the first data communication device 100 includes a controller 150, and the second data communication device 300 includes a controller 360. The controller 360 may be the same as the data processing unit 340 as hardware. The controller 360 is also driven by the electric power obtained by the conversion performed by the photoelectric conversion element 311.

The controller 150 of the first data communication device 100 is capable of controlling low power supply and high power supply that are performed by the PSE device 110. Feed energy by high power supply exceeds feed energy by low power supply.

Figure 6:
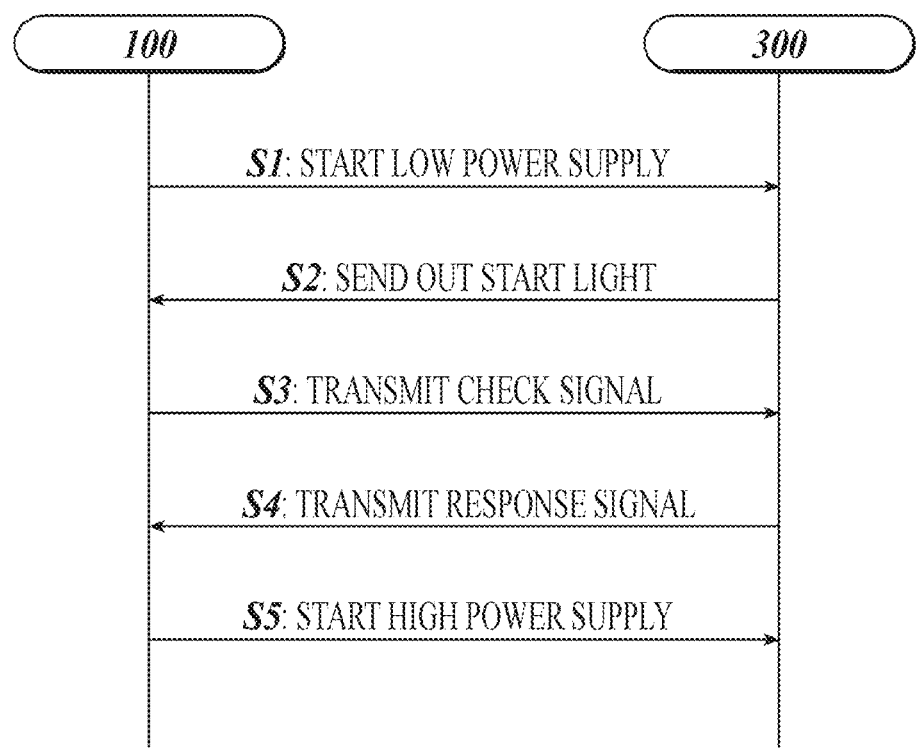
FIG. 6 is a flowchart showing a procedure of connection establishment and control of feed light.
Figure 7:
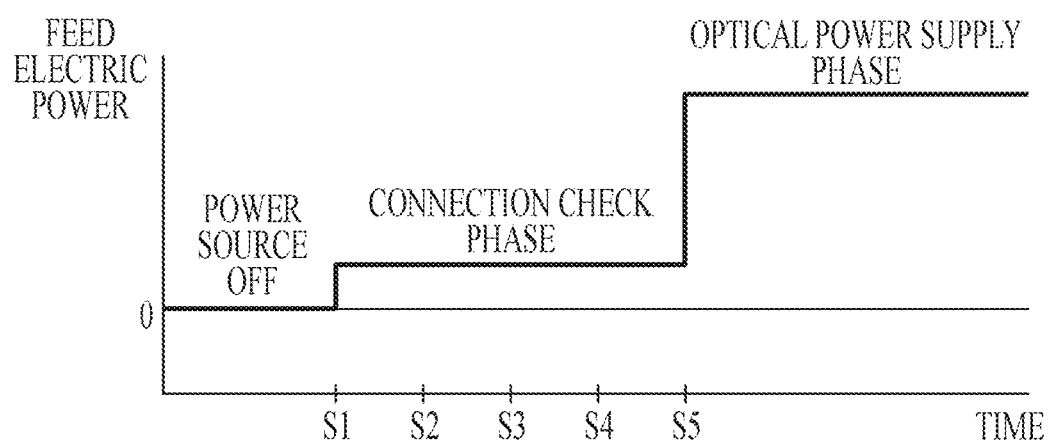
FIG. 7 is a chart showing change in feed electric power in accordance with the procedure shown in FIG. 6.

Explanation will be made with reference to the flowchart shown in FIG. 6. FIG. 7 shows feed electric power in Steps S1 to S5 described below.

First, the first data communication device 100 starts power supply by sending out feed light in response to, for example, an operation signal input to the first data communication device 100 (Step S1). Power supply in Step S1 is low power supply.

By receiving low power supply, the second data communication device 300 obtains electric power with the powered device 310 and starts with the electric power. That is, the transmitter 320, the receiver 330 and the controller 360 of the second data communication device 300 start operating.

When started, the second data communication device 300 sends out start light to the transmission path of signal light (Step S2). The start light is light emitted in tandem with the start. The start light is, for example, light emitted by the semiconductor laser 321, and unmodulated continuous light (laser light 323 itself output from the semiconductor laser 321) comes under the start light. This can be realized by configuring the second data communication device 300 such that whenever the modulator 322 does not modulate the laser light 323 on the basis of the transmission data 324, the laser light 323 passes through the modulator 322 toward the optical fiber 250.

After starting low power supply, when receiving through the photodiode 131 and detecting the start light of Step S2, the controller 150 of the first data communication device 100 transmits a predetermined check signal (e.g. a request for connection check) by signal light (Step S3).

When receiving the check signal of Step S3, the controller 360 of the second data communication device 300 transmits a response signal by signal light corresponding to the check signal (Step S4).

Figure 8:
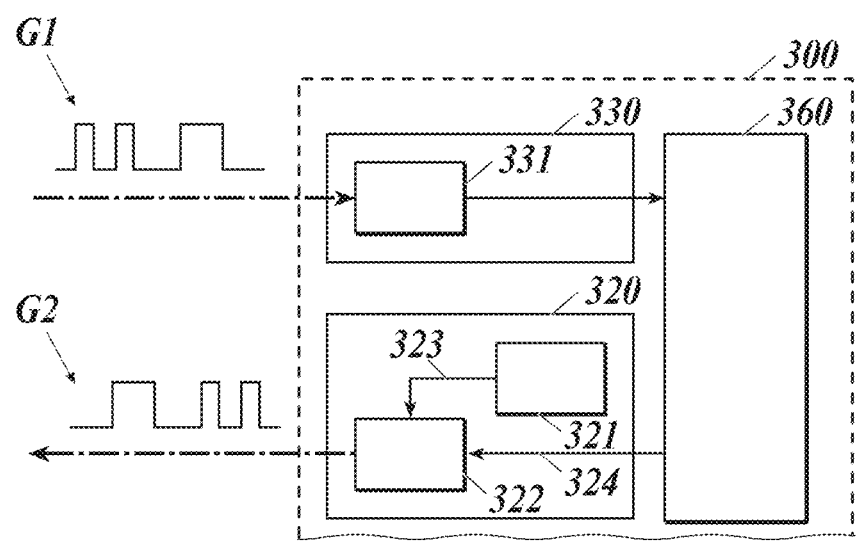
FIG. 8 is a block diagram of a communication device on the power receiving side with examples of a check signal and a response signal added.

The response signal is a signal obtained by performing a predetermined arithmetic operation(s) on the received check signal in accordance with a communication protocol. When the communication protocol specifies "return the same signal", as shown in FIG. 8, a response signal G2 as the signal light 325 is the same as a check signal G1 as the signal light 125.

When receiving the signal light of the response signal of Step S4, which is a requirement, the controller 150 of the first data communication device 100 enables (allows) high power supply of the PSE device 110. In this embodiment, the controller 150 causes the PSE device 110 to start high power supply (Step S5). The controller 150 may cause the PSE device 110 to start high power supply in response to a request from the second data communication device 300. Before receiving the signal light of the response signal, the controller 150 disables (does not allow) high power supply of the PSE device.

Thus, unless communication connection is established, high power supply of the PSE device 110 does not start. For example, when the optical connector 240 is not connected, high power supply of the PSE device 110 does not start. This can prevent high-power feed light from being released to the outside. Further, when not receiving the response signal, which is a response to the check signal of Step S3, within a predetermined time, the controller 150 may stop low power supply.

Figure 9:
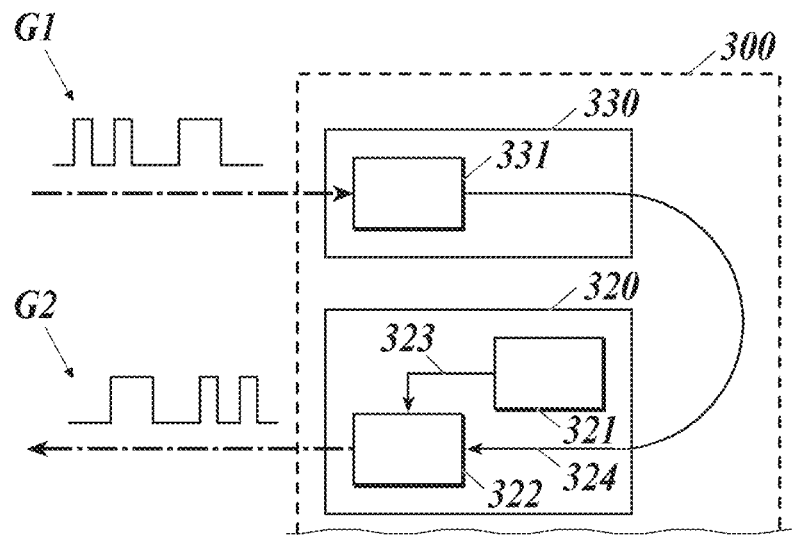
FIG. 9 is a block diagram of the communication device on the power receiving side with the examples of the check signal and the response signal added, wherein the controller is omitted.

The controller 360 is a digital processor. However, as shown in FIG. 9, the loopback can be completed with an analog circuit by inputting, to the modulator 322, an electrical signal into which the photodiode 331 converts the check signal G1. Thus, the controller 360 may be omitted.

In the case of no controller 360 provided, feed electric power by low power supply can be limited and reduced to the minimum electric power that can drive the transmitter 320 and the receiver 330. In the case of the controller 360 provided, feed electric power by low power supply can be limited and reduced to the minimum electric power that can drive the transmitter 320, the receiver 330 and the controller 360.

Feed electric power by high power supply exceeds feed electric power by low power supply, and can be in the range from more than the feed electric power by low power supply to feed electric power corresponding to the highest power of the PSE device 110. High power supply does not always indicate the highest power of the PSE device 110.

In low power supply and high power supply, feed light may be pulsed light, and feed electric power may be controlled by pulse width modulation (PWM).

The highest value of light intensity of feed light in low power supply may be set to be lower than the highest value of light intensity of feed light in high power supply in order that light intensity of feed light instantaneously emitted in low power supply can be lower than that in high power supply, so that safety can be ensured.

Alternatively, the highest value of light intensity of feed light in low power supply may be set to be equal to the highest value of light intensity of feed light in high power supply. In this case too, a certain level of safety can be ensured by decreasing the duty cycle and somewhat increasing the pulse frequency in low power supply, thereby reducing the amount of light emitted per unit time in low power supply.

Still alternatively, feed light may be not pulsed light but continuous light, and the value of light intensity of feed light in low power supply may be set to be lower than the value of light intensity of feed light in high power supply.

As described above, the first data communication device 100 starts up the second data communication device 300 by low power supply to the second data communication device 300, and enables high power supply after receiving predetermined light from the second data communication device 300, and disables high power supply before receiving the predetermined light from the second data communication device 30.

In the above embodiment, the predetermined light is the signal light of the response signal G2.

Although some embodiments of the present disclosure have been described above, these embodiments are made for purposes of illustration and example only. The present invention can be carried out in various other forms, and each component may be omitted, replaced or modified without departing from the scope of the present invention.

For example, in the above (2), the predetermined light for determining whether or not to enable high power supply is (the signal light of) the response signal G2, but may be the start light described above. In this case too, safety is higher than that in the case of performing high power supply from the beginning without obtaining any reaction light from the PD side driven under low power supply. Further, in this case or in the embodiment described in the above (2), the start light may be light modulated under the control of the controller 360 and carrying a code indicating that the second data communication device 300 has started in accordance with the communication protocol.

A power over fiber system according to at least one embodiment of the present disclosure includes: a first data communication device including a power sourcing equipment device including a semiconductor laser that oscillates with electric power, thereby outputting feed light; a second data communication device including a powered device including a photoelectric conversion element that converts the feed light into electric power, the second data communication device performing optical communication with the first data communication device; and an optical fiber cable including a first end connectable to the first data communication device and a second end connectable to the second data communication device to transmit the feed light and signal light, wherein the electric power obtained by the conversion of the feed light by the photoelectric conversion element is driving power for the second data communication device, wherein the first data communication device is capable of controlling low power supply and high power supply that are performed by the power sourcing equipment device, feed electric power by the high power supply exceeding feed electric power by the low power supply, and wherein the first data communication device starts up the second data communication device by the low power supply to the second data communication device, and enables the high power supply after receiving predetermined light from the second data communication device, and disables the high power supply before receiving the predetermined light.

The power over fiber system according to at least one embodiment of the present disclosure can prevent high-power feed light from being released to the outside.

What is claimed is:

1. A power over fiber system, comprising:
   a first data communication device including a power sourcing equipment device including a semiconductor laser that oscillates with electric power, thereby outputting feed light;
   a second data communication device including a powered device including a photoelectric conversion element that converts the feed light into electric power, the second data communication device performing optical communication with the first data communication device; and an optical fiber cable including a first end connectable to the first data communication device and a second end connectable to the second data communication device to transmit the feed light, first signal light, and second signal light, wherein the electric power obtained by the conversion of the feed light by the photoelectric conversion element is driving power for the second data communication device, wherein the first data communication device is configured for controlling low power supply and high power supply that are performed by the power sourcing equipment device, feed electric power by the high power supply exceeding feed electric power by the low power supply, and wherein the first data communication device starts up the second data communication device by the low power supply to the second data communication device, wherein the second data communication device, upon being started up by the low power supply, transmits start light by the second signal light to the first data communication device, wherein the first data communication device, in response to receiving the start light from the second data communication device after starting up the second data communication device by the low power supply, transmits a predetermined check signal by the first signal light, wherein the second data communication device, in response to receiving the predetermined check signal, performs a predetermined arithmetic operation on the received check signal to obtain a response signal, and transmits the response signal by the second signal light to the first data communication device, wherein the first data communication device disables the high power supply before receiving the response signal from the second data communication device, and enables the high power supply in response to receiving the response signal from the second data communication device, and wherein the first signal light transmits a signal but does not supply power;

wherein the start light is unmodulated continuous laser light transmitted in tandem with a start of the second data communication device by the low power supply.

2. The power over fiber system according to claim 1, wherein a semiconductor material of a semiconductor region of the semiconductor laser is a laser medium having a laser wavelength of 500 nm or less, the semiconductor region exhibiting a light-electricity conversion effect.

3. The power over fiber system according to claim 1, wherein the first data communication device stops the low power supply in response to not receiving the response signal within a predetermined time.

4. The power over fiber system according to claim 1, wherein the optical fiber cable is one optical fiber cable that transmits the first signal light and the second signal light bidirectionally.

5. A power-supplying-side data communication device of a power over fiber system, comprising:

a power sourcing equipment device including a semiconductor laser that oscillates with electric power, thereby outputting feed light, wherein the power-supplying-side data communication device is configured for controlling low power supply and high power supply that are performed by the power sourcing equipment device, feed energy by the high power supply exceeding feed energy by the low power supply, wherein the power-supplying-side data communication device starts up a connection-counterpart data communication device by the low power supply to the connection-counterpart data communication device, transmits a predetermined check signal by first signal light, in response to receiving start light transmitted by second signal light from the connection-counterpart data communication device after starting up the connection-counterpart data communication device by the low power supply, disables the high power supply before receiving predetermined light generated by the connection-counterpart data communication device in response to the predetermined check signal, and enables the high power supply in response to receiving the predetermined light from the connection-counterpart data communication device, wherein the predetermined light is a signal obtained by performing a predetermined arithmetic operation on the predetermined check signal, and wherein the first signal light transmits a signal but does not supply power;

wherein the start light is unmodulated continuous laser light transmitted in tandem with a start of the connection-counterpart data communication device by the low power supply.

6. The power-supplying-side data communication device according to claim 5, wherein a semiconductor material of a semiconductor region of the semiconductor laser is a laser medium having a laser wavelength of 500 nm or less, the semiconductor region exhibiting a light-electricity conversion effect.

7. The power-supplying-side data communication device according to claim 5, wherein the power-supplying-side data communication device stops the low power supply in response to not receiving the predetermined light within a predetermined time.

8. The power-supplying-side data communication device according to claim 5, wherein the power-supplying-side data communication device is connectable to the connection-counterpart data communication device through one optical fiber cable that transmits signal light bidirectionally.

* * * * *